United States Patent
Aa et al.

(10) Patent No.: US 12,210,452 B2
(45) Date of Patent: Jan. 28, 2025

(54) DATA STORAGE DEVICE AND METHOD FOR DYNAMIC LOGICAL PAGE WRITE ORDERING

(71) Applicant: Western Digital Technologies, Inc., San Jose, CA (US)

(72) Inventors: Noor Mohamed Aa, Kumbakonam (IN); Ramanathan Muthiah, Bangalore (IN); Subash Rajaram, Cuddalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/224,820

(22) Filed: Jul. 21, 2023

(65) Prior Publication Data

US 2024/0394182 A1  Nov. 28, 2024

Related U.S. Application Data

(60) Provisional application No. 63/468,063, filed on May 22, 2023.

(51) Int. Cl.
*G06F 12/02* (2006.01)
*G06F 12/126* (2016.01)

(52) U.S. Cl.
CPC ........ *G06F 12/0253* (2013.01); *G06F 12/126* (2013.01)

(58) Field of Classification Search
None
See application file for complete search history.

(56) References Cited

U.S. PATENT DOCUMENTS

| | | | |
|---|---|---|---|
| 11,341,039 B2 * | 5/2022 | Wang | G06F 12/0246 |
| 2015/0089325 A1 * | 3/2015 | Chandrasekhar | G11C 16/22 714/766 |
| 2016/0266934 A1 * | 9/2016 | Rimoni | G06F 3/0659 |
| 2017/0123655 A1 * | 5/2017 | Sinclair | G06F 3/061 |
| 2019/0362081 A1 * | 11/2019 | Kanno | G06F 21/602 |
| 2021/0157672 A1 * | 5/2021 | Seol | G06F 11/1048 |

* cited by examiner

*Primary Examiner* — Edward J Dudek, Jr.
*Assistant Examiner* — Ralph A Verderamo, III
(74) *Attorney, Agent, or Firm* — Crowell & Moring LLP

(57) ABSTRACT

In some situations, the programming of one memory die can be suspended in favor of the programming of another memory die. This can lead to a delay in certain programming operations. To avoid this problem, a data storage device can perform dynamic logical page write ordering by determining an availability of each memory die of a plurality of memory dies and changing a programing order of the plurality of memory dies in response to the determined availability.

20 Claims, 8 Drawing Sheets

DATA STORAGE DEVICE AND METHOD FOR DYNAMIC LOGICAL PAGE WRITE ORDERING

CROSS-REFERENCE TO RELATED APPLICATION

This application claims priority to U.S. provisional patent application No. 63/468,063, filed May 22, 2023, which is hereby incorporated by reference.

BACKGROUND

A host can send a write command to store data in a memory of a data storage device. The memory of the data storage device can comprise a plurality of memory dies. In some situations, the programming of one memory die can be suspended in favor of the programming of another memory die. This can lead to a delay in certain programming operations.

DETAILED DESCRIPTION

The following embodiments generally relate to a data storage device and method for dynamic logical page write ordering. In one embodiment, a data storage device is provide comprising a memory comprising a plurality of memory dies and a controller coupled with the memory. The controller is configured to: determine an availability of each memory die of the plurality of memory dies; and change a programing order of the plurality of memory dies in response to the determined availability.

In another embodiment, a method is provide that is performed in a data storage device comprising a memory comprising a plurality of memory dies. The method comprises: determining an availability of each memory die of the plurality of memory dies; and changing a programing order of the plurality of memory dies in response to the determined availability.

In yet another embodiment, a data storage device is provided comprising: a memory comprising a plurality of memory dies; means for determining an availability of each memory die of the plurality of memory dies; and means for changing a programming order of the plurality of memory dies in response to the determined availability.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1A:
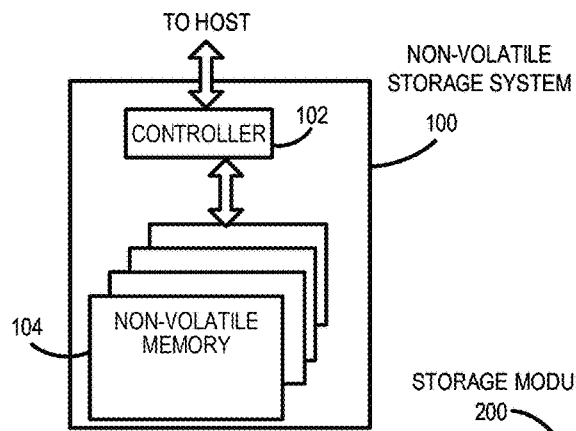
FIG. 1A is a block diagram of a data storage device of an embodiment.
Figure 1B:
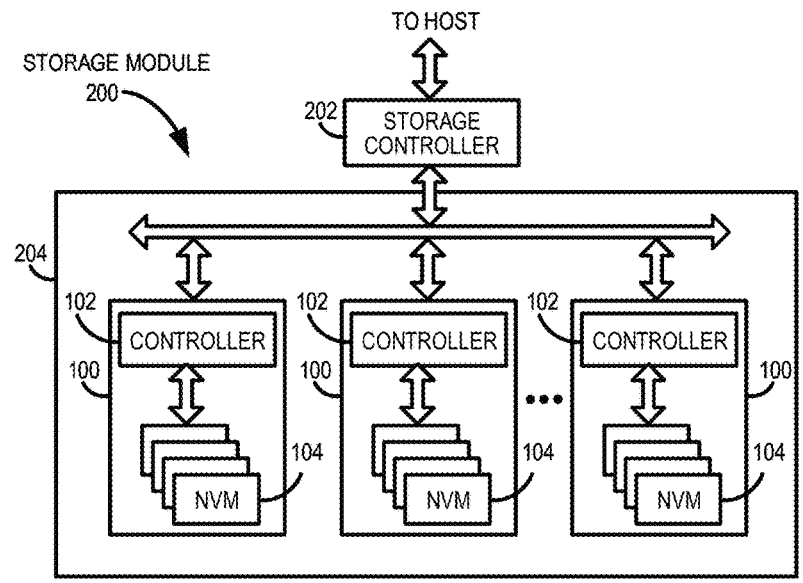
FIG. 1B is a block diagram illustrating a storage module of an embodiment.
Figure 1C:
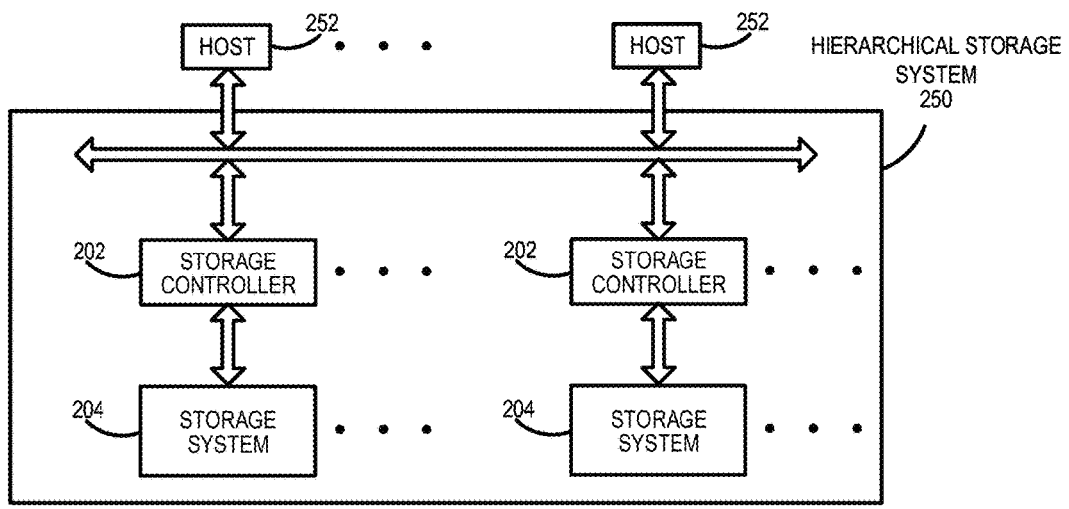
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
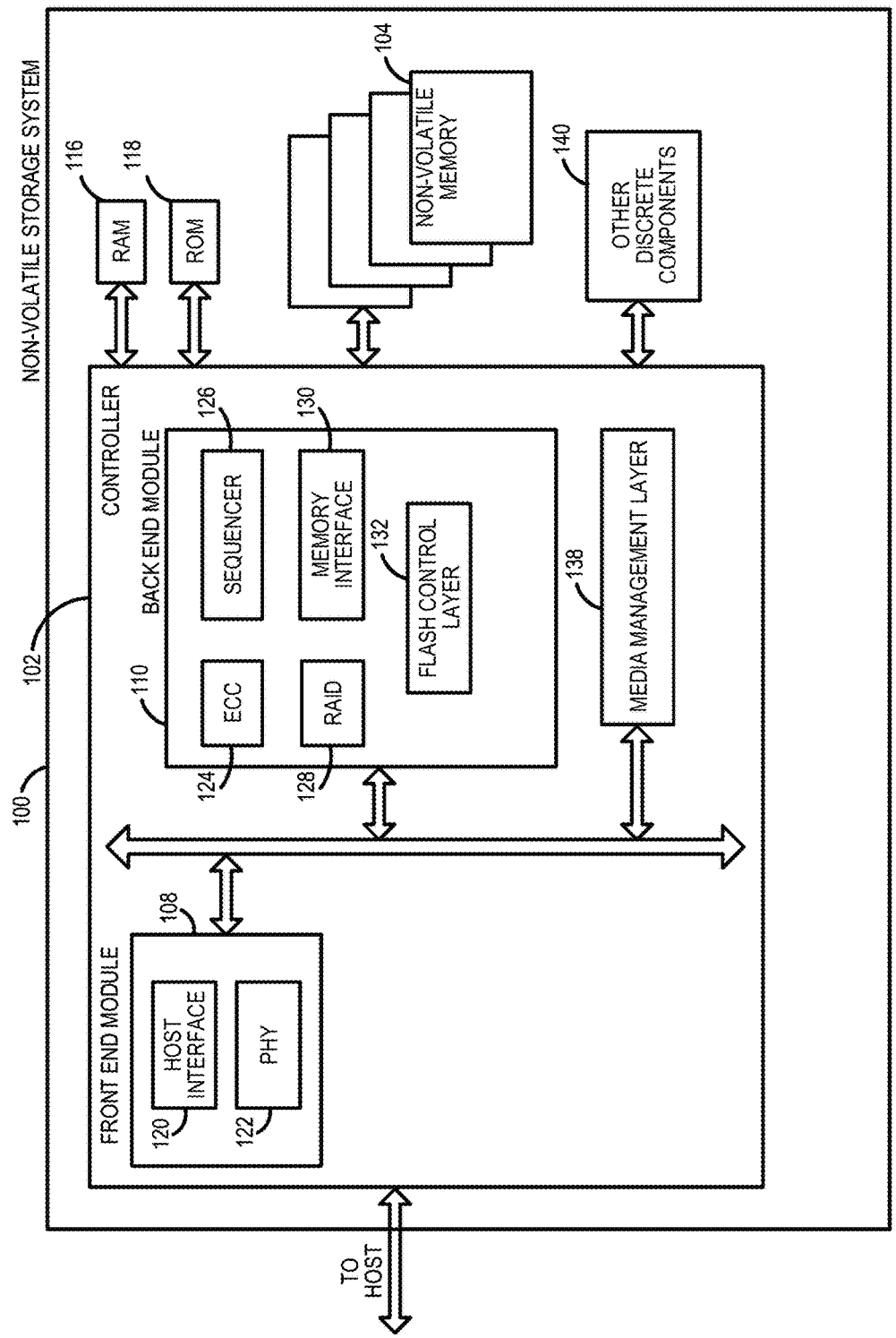
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
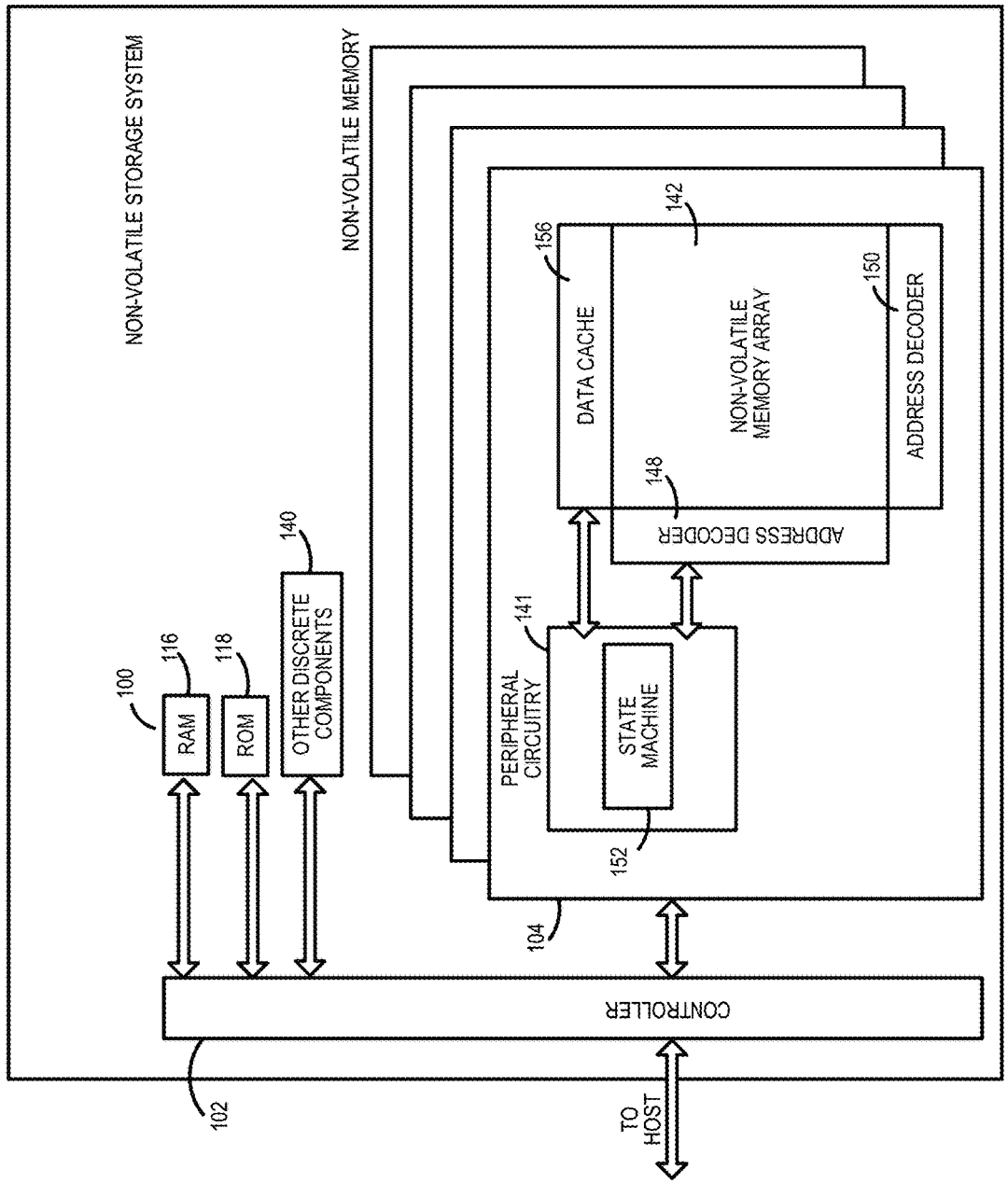
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
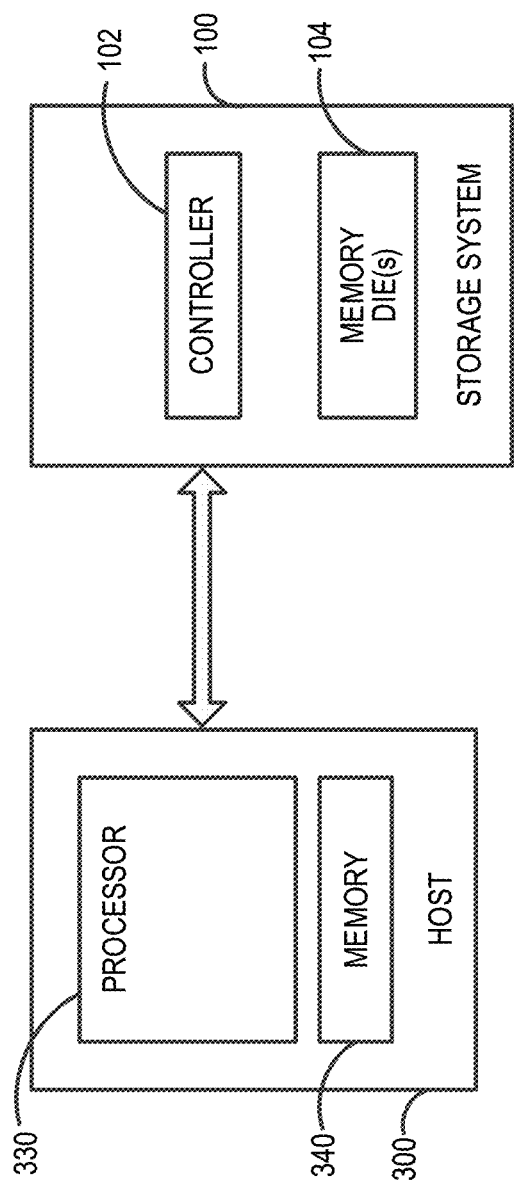
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Program suspension in NAND leads to more delay for completion of a metapage since some dies are suspended half-way to program second data. Given a design, there is a pattern in the program suspension order, and the following embodiments can be used to leverage that order to improve the performance of the system. In general, these embodiments can be applied to any program suspension architecture where a die is suspended to write other data. To illustrate these embodiments and its advantages in a program-suspend architecture, the following example is presented were a triple-level cell (TLC) write is suspended by exclusive-or (XOR) parity.

XOR is a feature used in solid-state drive (SSD) architectures to optimize a dual-write scheme and provide data-loss protection in the event of failures (such as program and read failures on open blocks) by maintaining XOR parity, which helps in recovering a failed page. Also, the XOR feature has a quantified impact on write performance of the data storage device. In linear XOR schemes, the completion of metapage timings are important for sequential performance, which is impacted by the suspension of the dies in a program-suspend-resume (PSR) architecture. The following embodiments can be used to optimize this performance.

Figure 4:
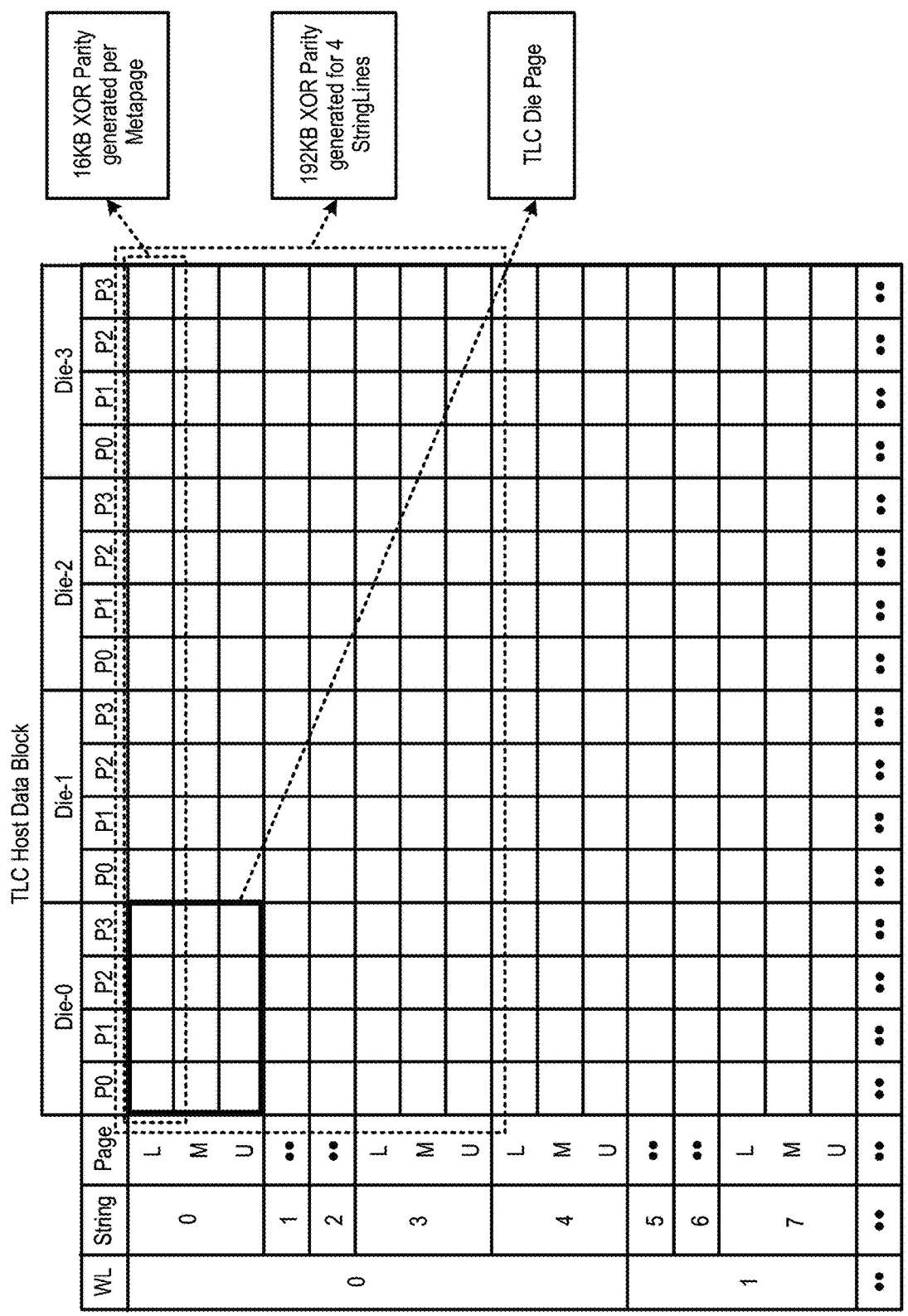
FIG. 4 is a diagram illustrating a triple-level cell (TLC) host write of an embodiment.
Figure 5:
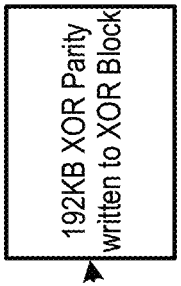
FIG. 5 is a diagram illustrating a single-level cell (SLC) parity write of an embodiment.

In one embodiment, a 16 KB XOR bin is generated per metapage/stringline, and the XOR parity data is accumulated in volatile memory (e.g., RAM) for four stringlines (192 KB) before writing it to an XOR parity block. The XOR parity data (e.g., 192 KB) fills three die pages at one instance of parity data write in four-plane memories (e.g., BiCS6 and above). The XOR parity write can be issued by the controller 102 when triple-level cell (TLC) writes are in progress in the memory 104, which internally suspends the current ongoing TLC write and programs newly-issued single-level cell (SLC) XOR parity data and resumes back the TLC write once the SLC programming is done. This is done with the help of a NAND feature referred to herein as a TLC program-suspend-resume (PSR) feature. In short, the TLC metapage write involves all dies, but only a few dies are suspended among them to write parity data in parity blocks. This information is leveraged to optimize performance. FIGS. 4 and 5 show writes to the host TLC block and its corresponding XOR parity write to the parity block. For illustration, a four-die example is used.

It may be noted that the XOR parity is written in some dies only for a given TLC metapage. In this example, Dies 0-2 are suspended for parity writes, and Die 3 is not suspended. Post suspension, once the entire TLC is written, the parity is freed for the next cycle (e.g., for the next TLC metapage). In the next TLC cycle, the dies participating in parity writes are Die 3, Die 0, and Die 1. In this way, the dies start from wherever they previously left off, as is the usual case for NAND writes.

Figure 6:
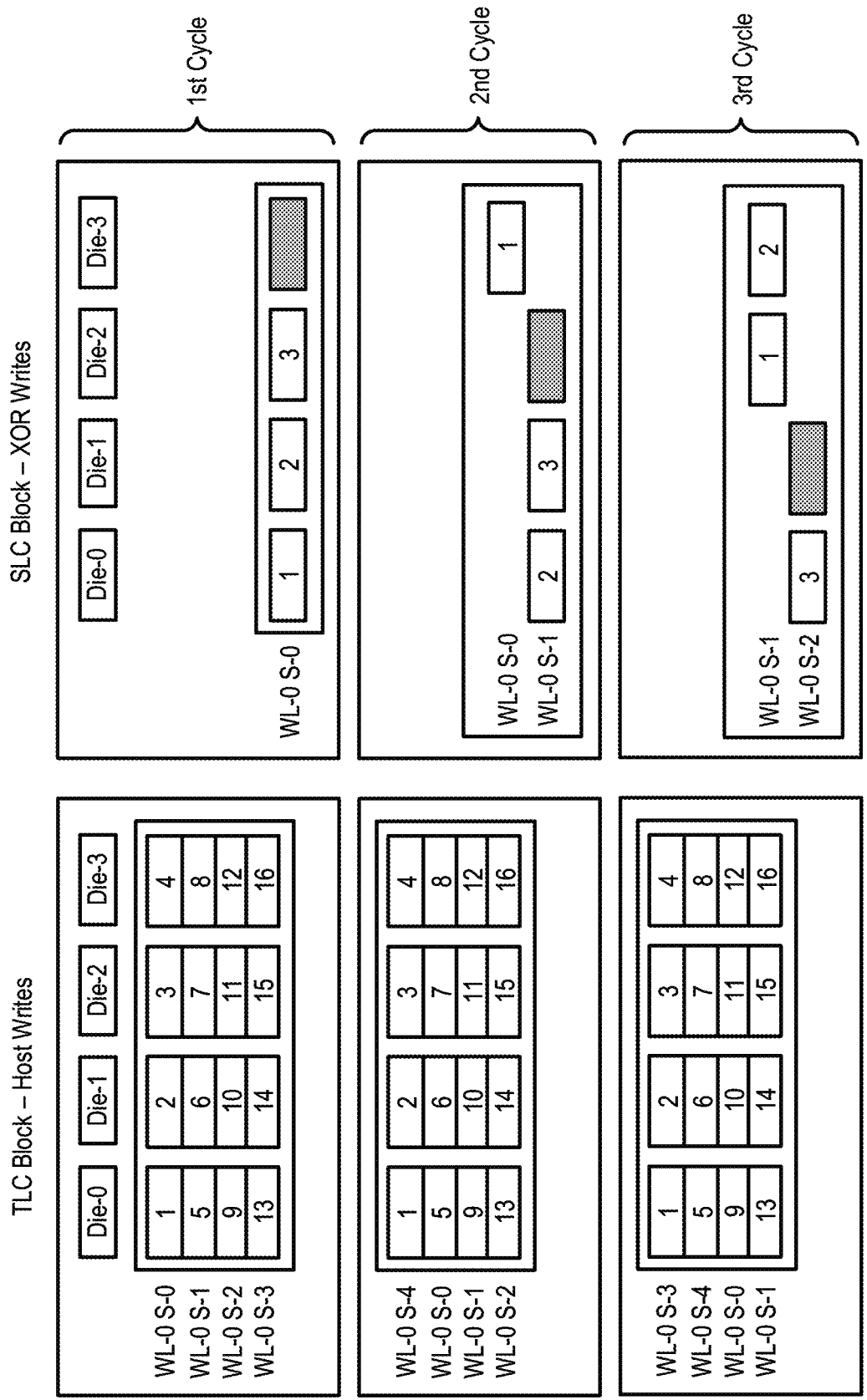
FIG. 6 is a diagram illustrating a write order of an embodiment.

FIG. 6 is a diagram that shows the order of write requests submitted by the flash translation layer (FTL) to the low-level controller for a metapage. In this example, the PSR requirement is 192 KB and, hence, is triggered only on few dies. The dies where the PSR is triggered would complete TLC writes only after a SLC program delay; hence, the dies un-impacted by PSR would be faster in cycle completion.

The following are steps performed in this example.

Step 1: TLC writes first cycle for four metapages (Die 0, Die 1, Die 2, Die 3)

Step 2: XOR parity writes in the SLC block (192 KB)-three die pages (Die 0, Die 1, Die 2)

Step 3: TLC writes second cycle for four metapages (Die 0, Die 1, Die 2, Die 3)

Step 4: XOR parity writes in the SLC block (192 KB)-three die pages (Die 3, Die 0, Die 1)

Step 5: TLC writes third cycle for four metapages (Die 0, Die 1, Die 2, Die 3)

Step 6: XOR parity writes in the SLC block (192 KB)-three die pages (Die 2, Die 3, Die 0)

These steps continue until one of the TLC or SLC blocks is full.

At the end the step 1, all dies (0/1/2/3) are busy with TLC writes (with an approximate program time of about 2 ms), and, in step two, SLC XOR writes (with an approximate program time of about 100 us) are issued on dies (0/1/2), which will trigger Program Suspend Resume (PSR) for the ongoing TLC writes. In step three, again the TLC writes are issued on all dies (0/1/2/3). Since the completion granularity is at the TLC metapage level (for parity cache to be freed for the next cycle), any suspension of a die involved in TLC writes will have an impact on this cycle latency. In one example, it will take approximately 2.15 ms (step one plus step two times) for step three to start TLC programming on the same die, which will affect the sequential performance of the device as the dies are blocked.

In one embodiment, the controller 102 can modify the logical page programming order based on the availability status of each die associated to a logical block. This is not dependent on program-suspend-resume (PSR), barrier state, TLC/SLC usages, read/writes, or parity writes. The number of entries in a queue per die (QPD) of a die can be an indication of die availability and its workload. Thus, in one embodiment, the controller 102 can modify the logical page programming order based on the number of entries in the QPD of various dies associated to the logical block. To accommodate this, the controller 102 can look at the least-loaded die (e.g., in terms of QPD entries) and issue the metapage write start from that die without any dependency on barrier. The rest of the metapage can be issued to the next set of minimal loaded dies in that ranking. This can be useful in early completion of metapage writes leading to better RAID management.

The die availability order itself can change due to multiple factors, such as, for example, suspension of only a few dies during TLC write for want of SLC write. The speed (fast/slow) of a die can be another factor. Also, the suspension of a die can be triggered due to various reasons, such as, but not limited to, a control page write, parity write, or a MIP write.

In one example involving suspension of TLC writes for SLC parity write, the controller 102 can determine that only some of the dies are suspended to perform parity writes and, hence, can modify the TLC metapage write order. So, PSR and barrier usage can be an example use case of the controller 102 to derive the advantages of out-of-order metapage write in a logical page In one use case, the controller 102 can order the dies for writes such that the die(s) that do not participate (or are not impacted) in the program suspension are the die(s) that come last in the programming order of logical metapage. Such a zig-zag type of metapage is formed within a meta block to ensure a portion of latency due to program suspension is hidden. The dies that are suspended get more time since they are started with programming in the beginning of metapage cycle itself.

In one embodiment, the program suspension can be suspension of TLC or QLC writes, applicable to both direct write and fold architectures. The program suspension can also be for the purposes of writing second data (e.g., parity, host data (such as host SLC data), or control data (such as logical-to-physical (L2P) address translation data, log data, or diagnostic data). In general, the controller 102 of these embodiments can check die availability and change the programming order based on die availability. The detected die availability can be based on queue per die (QPD). The metapage write can be initialized from a die selected based on die availability, and the metapage write can be user data (e.g., garbage collection data or host data). Also, the die can be chosen based on availability, so a zigzag order discussed above can be achieved.

Many alternatives are possible. For instance, in the example discussed above, TLC writes were suspended to write parity in a SLC block. In another embodiment, the die programming order (metapage) is changed for writing first data when one or more dies have to be suspended to write second data. Also, in situations where the controller 102 suspends of only a few sets of dies during a metapage write, the controller 102 can group pages of all those uninvolved and, hence, unimpacted dies towards the end for that metapage, thereby minimizing the latency through die-workload management for TLC/QLC metapage write completion. This provides as advantage, as metapage write completion time can be an important design consideration for performance if the parities are maintained at this granularity.

In another alternative, the controller 102 can determine which of the dies are suspended for what number of times during a metapage write and have a "write arrangement module" to determine the order of programming pages for that metapage. The module can look for dies that are suspended the most (either by number or by time), group and program them first (or earlier), and issue L2P updates consistent with the chosen physical location, thereby enabling more time for those dies for logical page completion. A change in order is taken care by L2P mapping, hence there is no complexity with the zig-zag writes. Also, it should be noted that these advantages are obtained during regular device time (normal sustained writes) and, hence, are advantageous to the system right from the first device cycle itself.

Below is an example of a proposed order of write requests submitted to a low-level controller for a metapage, Step 1: TLC writes first cycle for four metapages (Die 0, Die 1, Die 2, Die 3)

Step 2: XOR parity writes on SLC Block (192 KB)-three die pages (Die 0, Die 1, Die 2)

Step 3: TLC writes second cycle for four metapages with modified write order (Die 3, Die 0, Die 1, Die 2). In this step, the controller 102 can modifies the write logic and keeps Die 2 as the last die participating in the metapage since Die 2 is not suspended for parity writes in the next step (step 4) for this cycle.

Step 4: XOR parity writes on SLC Block (192 KB)-three die pages (Die-3, Die-0, Die-1).

Step 5: TLC writes third cycle for four metapages with modified write order (Die 2, Die 3, Die 0, Die 1).

Step 6: XOR parity writes on SLC Block (192 KB)-three die pages (Die 2, Die 3, Die 0). Similarly, since in step 6, Die 1 is not used for parity writes (and, hence, not suspended), the controller 102 can form a TLC metapage where Die 1 comes at the end (step 5). Die 1 is the bottleneck in this cycle since it is last one, and as per this method, the bottleneck die is not at least suspended, thus enabling optimum sustained write performance.

This process continues until one of the blocks TLC or SLC gets full. Also, at the end of step 2, the SLC parity write will be active on Dies (0/1/2) along with TLC writes on the dies, whereas Die 3 is active only with TLC write. So, the idea is to change the write order on Step 3 by issuing the TLC write to Die 3 at time TO instead of Die 0. The approach here is to start the writes from the die where SLC XOR parity writes are not issued in the previous step. Doing so will save the wait time of the dies before issuing the next program commands. This can result in savings of one SLC program time for one TLC program time at a metapage level.

Figure 7:
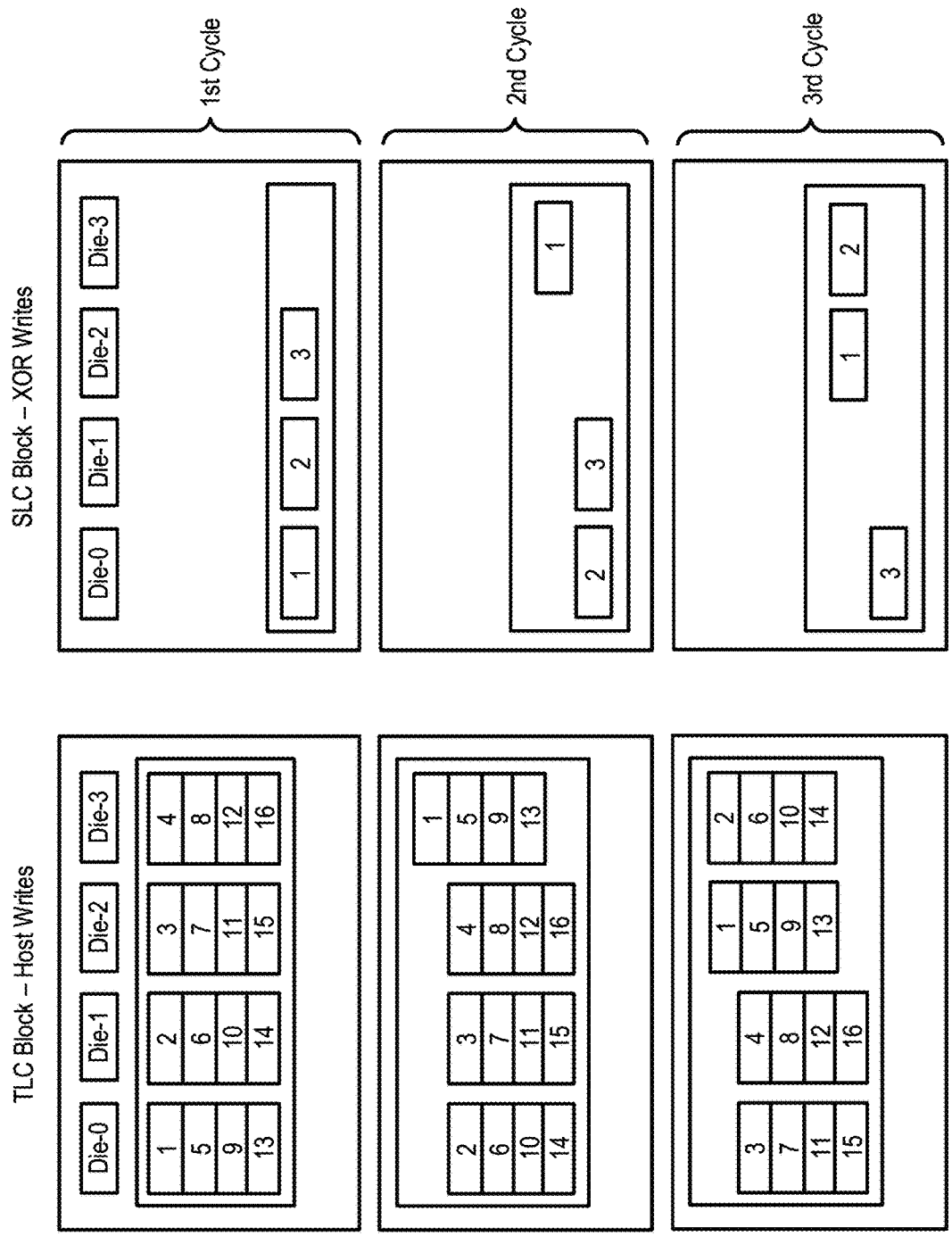
FIG. 7 is a diagram illustrating a modified write order of an embodiment.

FIG. 7 is a diagram showing a modified write ordering scheme of this embodiment. The numbers in the boxes show the write order with respect to the TLC metapage cycle. "1" indicates the first 64 KB of data, "2" the next 64 KB of data, and so on. In this embodiment, the initial data writes ("1") are not always started with Die 0 but rather with the die that can complete the last cycle earlier in time (i.e., the die not impacted by PSR in last cycle). With the change in the order of write to the dies (0/1/2/3) shown in FIG. 7, wait time in firmware for the dies to respond can be reduced, and sequential write performance can be increased.

There are several advantages associated with these embodiments, including, but not limited to, improved device performance and the fact that the memory 104 can be engaged by firmware in the controller 102 efficiently. Also, the PSR can lead to one SLC delay in dies (e.g., 150 us) during a TLC program (e.g., 1500 us). With these embodiments, by switching the write order to utilize a free die, a gain of one SLC program can be achieved. Since this is done every TLC cycle (e.g., 1500 us), the gain is roughly 10% assuming no firmware overhead. In cases with multiple dies interleaving, this gain may vary.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory comprising a plurality of memory dies; and
   a processor coupled with the memory and configured to:
      suspend a triple-level cell (TLC) write for a single-level cell (SLC) parity write;
      determine an availability of each memory die of the plurality of memory dies; and
      change a programing order of the plurality of memory dies for a subsequent TLC write in response to the determined availability.

2. The data storage device of claim 1, wherein the availability of at least one memory die is based on queue per die (QPD) metric.

3. The data storage device of claim 1, wherein the processor is further configured initiate a write in one of the plurality of memory dies determined to be available.

4. The data storage device of claim 3, wherein the write causes garbage collection data to be written.

5. The data storage device of claim 3, wherein the write causes host data to be written.

6. The data storage device of claim 1, wherein the processor is further configured to modify a write pattern for every write.

7. The data storage device of claim 1, wherein the processor is further configured to align written data to parity writes in a parity block.

8. The data storage device of claim 1, wherein the processor is further configured to suspend writing of first data in favor of writing second data.

9. The data storage device of claim 1, wherein at least one of the plurality of memory dies comprises a three-dimensional memory array.

10. The data storage device of claim 1, wherein:
    determining the availability of each memory die comprises determining which memory die of the plurality of memory dies will not be suspended in the subsequent TLC write; and
    changing the programing order comprises selecting the memory die that will not be suspended in the subsequent TLC write as a last-programmed memory die for the subsequent TLC write.

11. In a data storage device comprising a memory comprising a plurality of memory dies, a method comprising:
    suspending a triple-level cell (TLC) write for a single-level cell (SLC) parity write;
    determining an availability of each memory die of the plurality of memory dies; and
    changing a programing order of the plurality of memory dies for a subsequent TLC write in response to the determined availability.

12. The method of claim 11, wherein the availability of at least one memory die is based on queue per die (QPD) metric.

13. The method of claim 11, wherein the controller is further configured initiate a write in one of the plurality of memory dies determined to be available.

14. The method of claim 13, wherein the write causes garbage collection data to be written.

15. The method of claim 13, wherein the write causes host data to be written.

16. The method of claim 11, further comprising modifying a write pattern for every write.

17. The method of claim 11, further comprising aligning written data to parity writes in a parity block.

18. The method of claim 11, further comprising suspending writing of first data in favor of writing second data.

19. The method of claim 11, wherein:
    determining the availability of each memory die comprises determining which memory die of the plurality of memory dies will not be suspended in the subsequent TLC write; and
    changing the programing order comprises selecting the memory die that will not be suspended in the subsequent TLC write as a last-programmed memory die for the subsequent TLC write.

20. A data storage device comprising:
    a memory comprising a plurality of memory dies;
    means for suspending a triple-level cell (TLC) write for a single-level cell (SLC) parity write;
    means for determining an availability of each memory die of the plurality of memory dies; and
    means for changing a programing order of the plurality of memory dies for a subsequent TLC write in response to the determined availability.

* * * * *